(12) United States Patent
Chen

(10) Patent No.: US 7,926,372 B2
(45) Date of Patent: Apr. 19, 2011

(54) SLIDING TRACK ASSEMBLY

(75) Inventor: Chugn Wei Chen, Sinjhuang (TW)

(73) Assignee: Jarllytec Co., Ltd., Taipei County (TW)

(*) Notice: Subject to any disclaimer, the term of this patent is extended or adjusted under 35 U.S.C. 154(b) by 1275 days.

(21) Appl. No.: 11/507,903

(22) Filed: Aug. 22, 2006

(65) Prior Publication Data

US 2007/0052334 A1   Mar. 8, 2007

(30) Foreign Application Priority Data

Sep. 8, 2005   (TW) ................. 94215458 U

(51) Int. Cl.
*F16H 21/44* (2006.01)
(52) U.S. Cl. ....................................... 74/100.1
(58) Field of Classification Search .............. 74/99 R, 74/100, 102, 104, 110, 126, 100.1; 361/679.01
See application file for complete search history.

(56) References Cited

U.S. PATENT DOCUMENTS

| | | | | |
|---|---|---|---|---|
| 4,861,814 A * | 8/1989 | Nakagawa et al. | ........... | 524/102 |
| 7,102,881 B2 * | 9/2006 | Park et al. | ................ | 361/679.08 |
| 7,363,066 B2 * | 4/2008 | Im et al. | ..................... | 455/575.4 |
| 7,574,243 B2 * | 8/2009 | Lee | ............. | 455/575.4 |
| 7,580,267 B2 * | 8/2009 | Kim | .............................. | 361/755 |
| 2004/0085739 A1 * | 5/2004 | Lee et al. | ...................... | 361/727 |
| 2005/0009581 A1 * | 1/2005 | Im et al. | ..................... | 455/575.4 |
| 2006/0180457 A1 * | 8/2006 | Han et al. | ...................... | 200/550 |

FOREIGN PATENT DOCUMENTS

WO    WO 2004018559 A1 *  3/2004

* cited by examiner

*Primary Examiner* — Vicky A Johnson
(74) *Attorney, Agent, or Firm* — Guice Patents PLLC

(57) ABSTRACT

A track assembly includes a track member, which has two parallel sliding grooves arranged in parallel at two sides and two locating holes spaced between the sliding grooves, a sliding member, which has two sliding rails respectively coupled to the sliding grooves of the track member and two locating holes spaced between the sliding rails, and two torsional springs arranged in the same direction on said track member and respectively connected between the locating holes of the track member and the locating holes of the sliding member such that the torsional springs automatically pushes the sliding rail to the open or close position when the user pushes the sliding rail to the midway toward the open or close position.

8 Claims, 4 Drawing Sheets

SLIDING TRACK ASSEMBLY

BACKGROUND OF THE INVENTION

1. Field of the Invention

The present invention relates to a sliding track assembly and more particularly, to such a sliding track assembly, which uses two torsional spring members to join a sliding member to a track member for allowing stable sliding movement of the sliding member relative to the track member.

2. Description of the Related Art

Sliding track assemblies are intensively used in different products around us. For example, a sliding track assembly allows a drawer to be moved in and out of a cabinet. Instead of the use of a hinge in a lifting cover type cell phone, a sliding track assembly may be used in a cell phone for allowing the sliding cover of the cell phone to be moved in and out of the mainframe of the cell phone between the open position and the close position. When the sliding cover is extended out, the operating face panel of the cell phone is exposed to the outside for operation. When the sliding cover is moved to the received (close) position, it keeps the operating face panel of the cell phone from sight.

Taiwan Patent Publication No. M252209, entitled "Sliding Cover Device", teaches the application of a sliding track assembly. According to this design, the sliding cover device (sliding track assembly) comprises a bottom plate, which has two sliding rails and a plurality of mounting through holes at two sides, and a top cover, which has a plurality of mounting through holes and two sliding grooves respectively coupled to the sliding rails, and a spring member, which has one end pivoted to one side of the bottom plate and the other end pivoted to the corresponding side of the top cover. Because this design uses only one single spring member and has the spring member coupled between the bottom plate and the top cover at one lateral side, the spring member does not hold the top cover in balance, i.e., the force of the spring member holds one lateral side of the top cover in close contact with the bottom plate and a gap is left between the other lateral side of the top cover and the corresponding lateral side of the bottom plate. Therefore, the top cover may vibrate when it is moved relative to the bottom plate.

In the specification of the cited Taiwan Patent, a prior art dual-spring type sliding cover structure is cited to have the drawback that the spring members tend to be broken or permanently deformed due to a thin diameter of the spring wires. Theoretically, the use of two spring members can keep the sliding cover is balance when the sliding cover is moved relative to the bottom plate. However, according to the cited prior art dual-spring type sliding cover structure, the two spring members each have a fixed end respectively fastened to a respective locating hole on the middle of the bottom plate. However, because the two locating holes of the bottom plate are arranged at different elevations and in a parallel manner relative to the sliding rails, the fixed ends of the two spring members are not aligned in line when the top cover is moved relative to the bottom plate to the dead point. At this time, a shearing force is produced, resulting in vibration of the top cover relative to the bottom plate.

SUMMARY OF THE INVENTION

The present invention has been accomplished under the circumstances in view. According to one aspect of the present invention, the sliding track assembly comprises a sliding member, a track member, and two torsional springs. The sliding member has two sliding rails arranged in parallel at two sides, and two locating holes spaced between the sliding rails. The track member has two parallel sliding grooves arranged in parallel at two sides for receiving the two sliding rails of the sliding member for allowing movement of the sliding member relative to the track member along the sliding grooves, and at least one locating hole spaced between the sliding grooves. The two torsional springs are arranged in the same direction on the track member, each having a first end respectively fastened to the locating holes of the sliding member and a second end respectively fastened to the at least one locating hole of the track member.

According to another aspect of the present invention, the number of the at least one locating hole of the track member is 2, and the two locating holes of the track member are transversely aligned in a line between the sliding grooves.

According to still another aspect of the present invention, the sliding member further has a transverse bar connected between the sliding rails. Further, the two opposite lateral sides of the sliding member are curved, forming the sliding rails.

According to still another aspect of the present invention, the sliding rails of the sliding member each have a plurality of mounting through holes for mounting, and the track member has a plurality of mounting through holes in corners thereof for mounting.

According to still another aspect of the present invention, the track member is injection-molded from a copolymer. Preferably, the copolymer is a self-lubricating plastic material, for example, polyoxymethylen.

DETAILED DESCRIPTION OF THE PREFERRED EMBODIMENT

Figure 1:
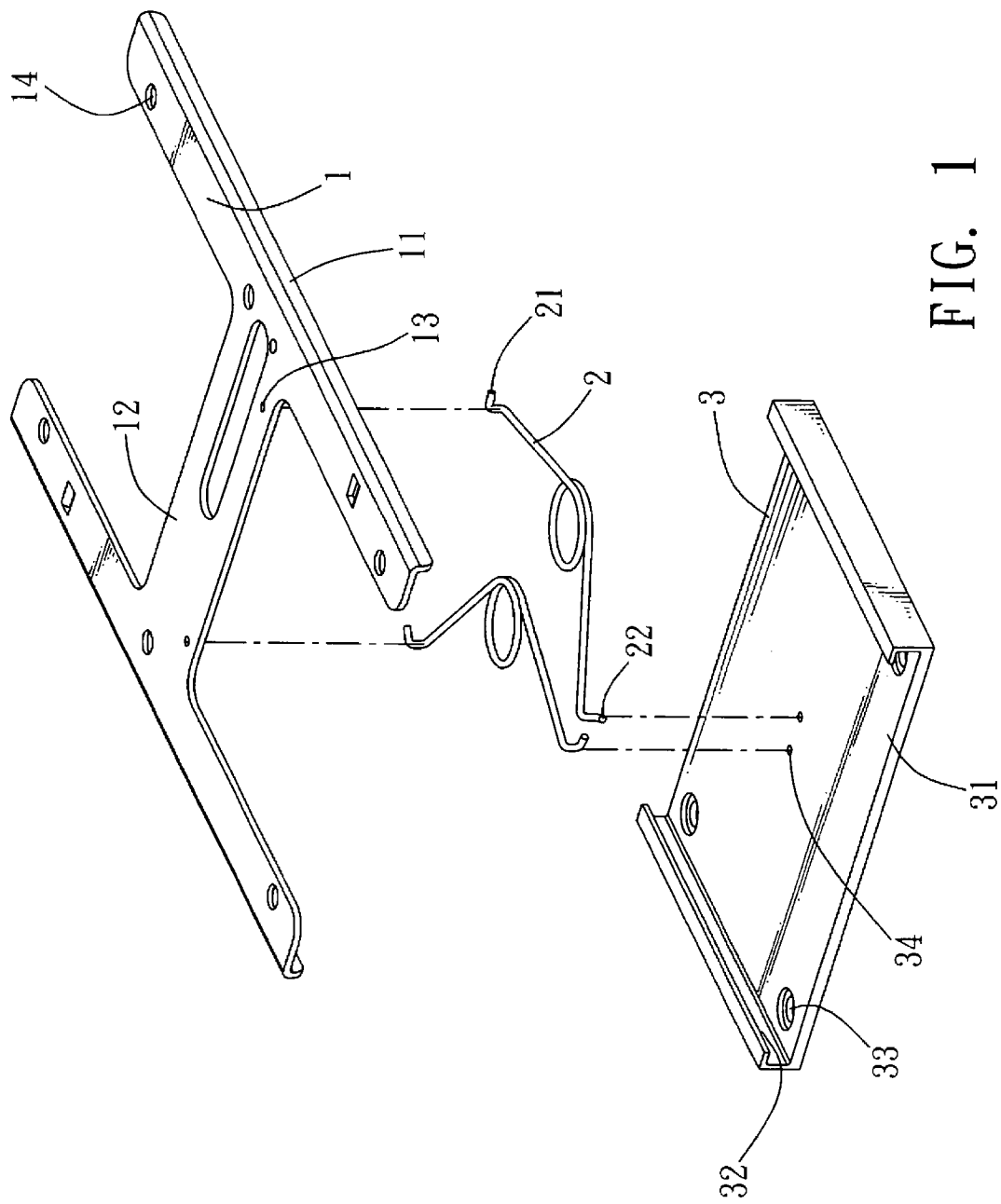
FIG. 1 is an exploded view of a sliding track assembly according to the present invention.
Figure 2:
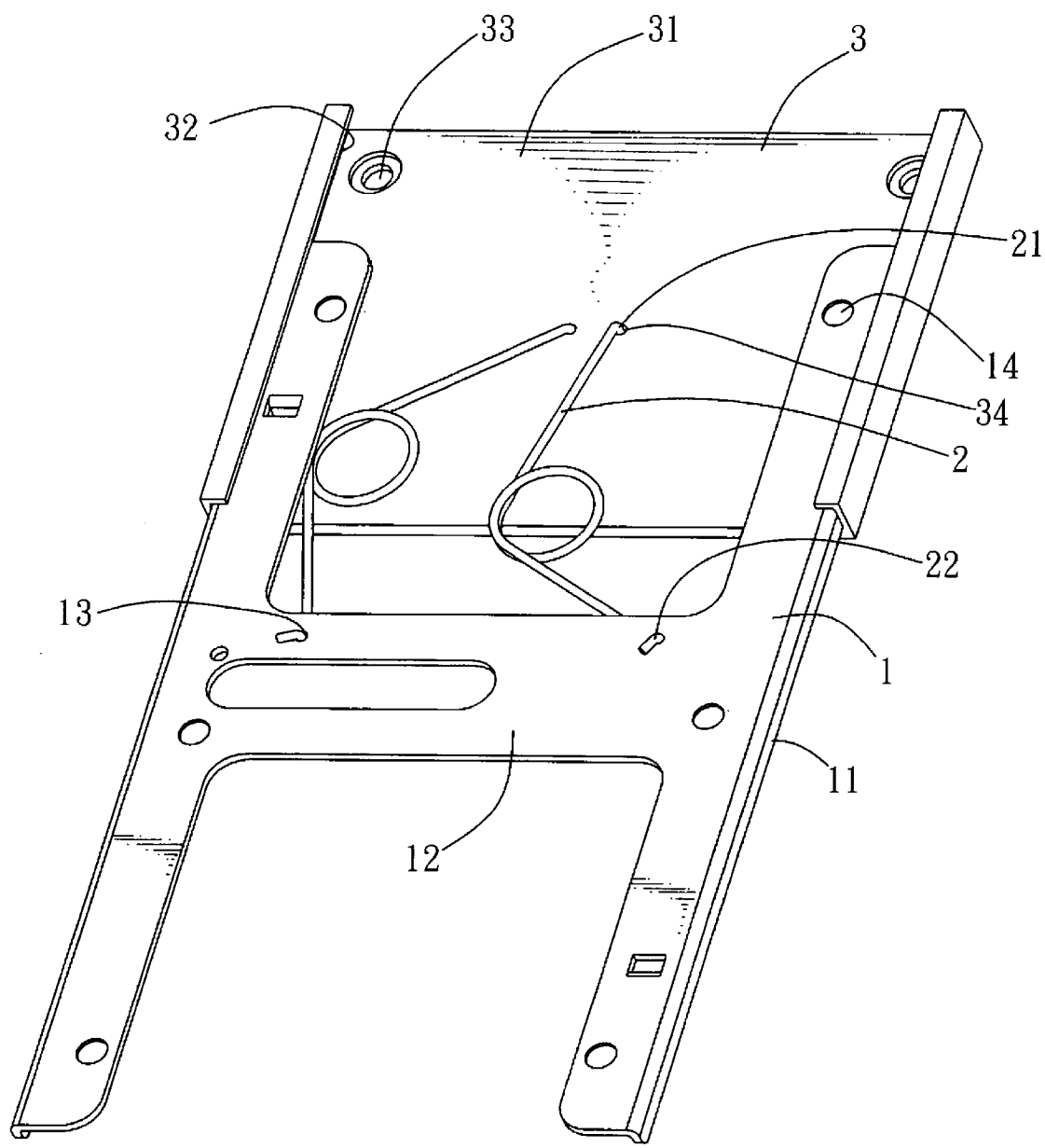
FIG. 2 is an elevational assembly view of the sliding track assembly according to the present invention.

Referring to FIGS. 1 and 2, a sliding track assembly in accordance with the present invention is shown comprised of a sliding member 1, two torsional springs 2, and a track member 3.

The sliding member 1 is a substantially H-shaped plate member having two parallel side sliding rails 11, a transverse bar 12 connected between the two side sliding rails 11, two locating holes 13 respectively formed on the transverse bar 12 near the side sliding rails 11, and a plurality of mounting holes 14 respectively formed on the side sliding rails 11 for enabling the sliding member 1 to be affixed to an object, for example, the sliding cover of a cell phone. According to this embodiment, the two opposite lateral sides of the sliding member 1 are respectively angled, thereby forming the sliding rails 11.

The track member 3 has a flat base 31, two sliding grooves 32 defined in parallel at two opposite lateral sides of the flat base 31 for receiving the side sliding rails 11 of the sliding member 1, a plurality of mounting through holes 33 respectively formed on the flat base 31 near the sliding grooves 32 for enabling the track member 3 to be affixed to an object, for example, the mainframe of the cell phone in which the sliding member 1 is installed, and two locating holes 34 formed on the flat base 31 around the center area. The two locating holes 34 are transversely aligned in a line between the two sliding grooves 32. According to the present preferred embodiment, the track member 3 is injection-molded from a copolymer, for example, polyoxymethylen, for the advantages of high toughness and wear resistance.

The two torsional springs 2 are arranged in the same direction, each having a movable end 21 respectively fastened to the locating holes 13 of the sliding member 1 and a fixed end 22 respectively fastened to the locating holes 34 of the track member 3.

Figure 3:
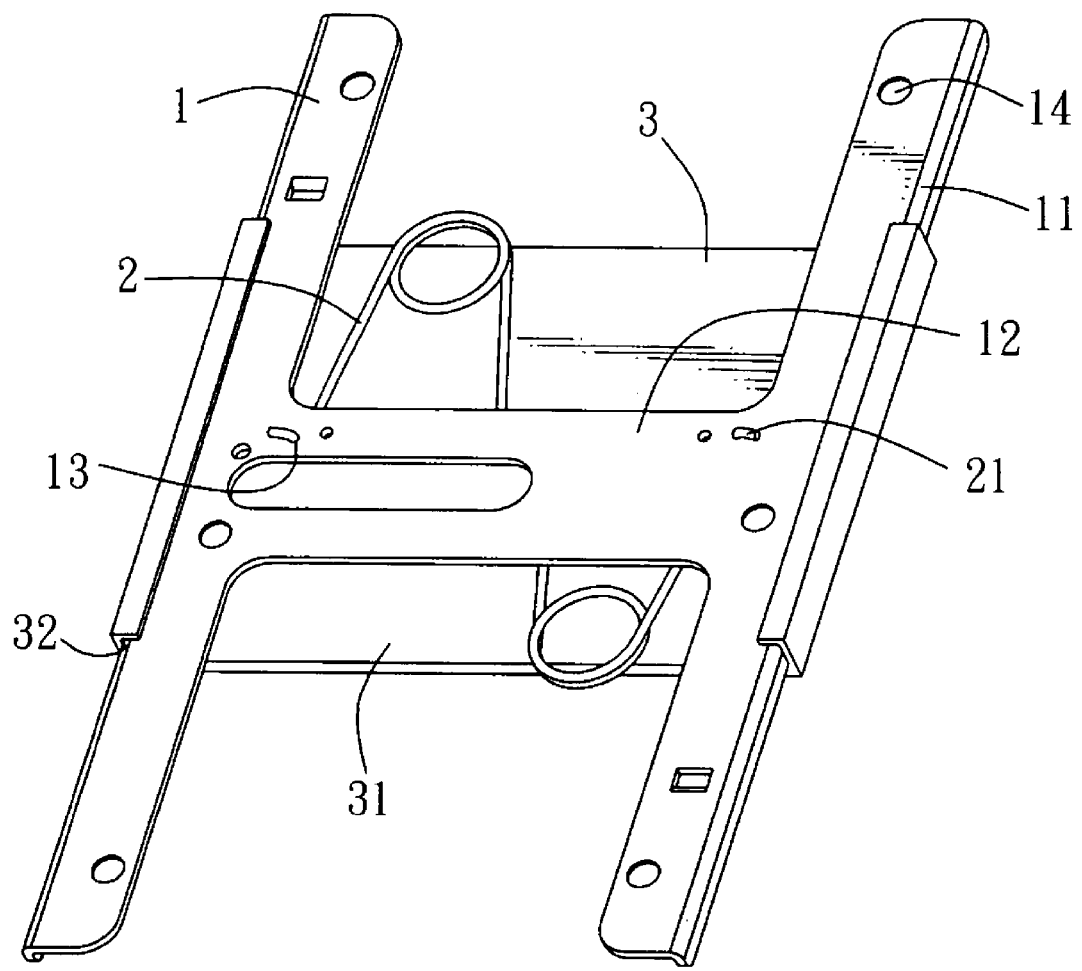
FIG. 3 is a schematic drawing of the present invention, showing the sliding member moved to the dead point.
Figure 4:
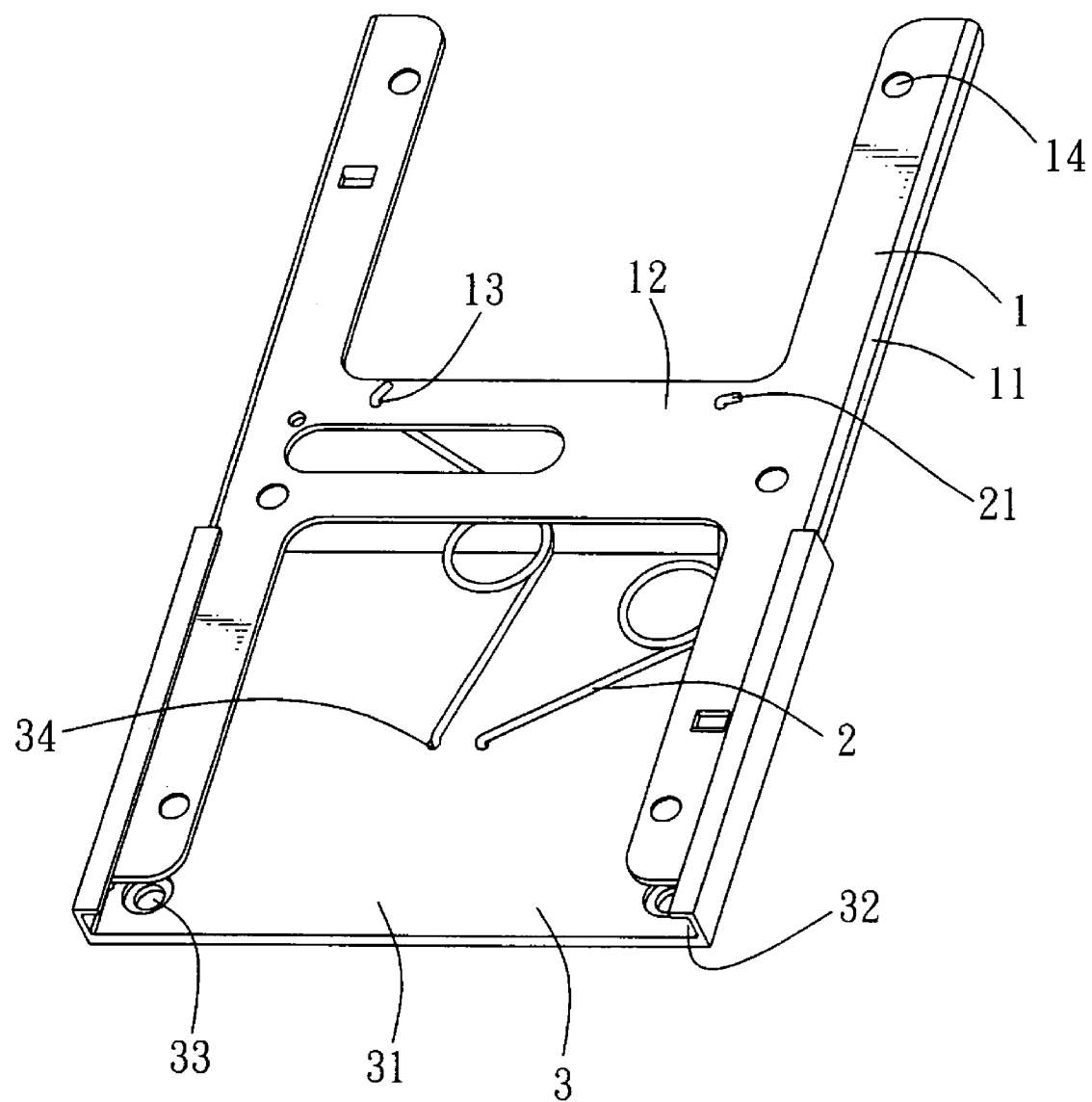
FIG. 4 is a schematic drawing of the present invention, showing the sliding member moved to the final point.

When an external push force is applied to the sliding member 1, the two sliding rails 11 of the sliding member 1 are respectively moved along the sliding grooves 32 of the track member 3, and the two torsional springs 2 are compressed. When the sliding member 1 is moved to the dead point as shown in FIG. 3, the movable ends 21 and fixed ends 22 of the torsional springs 2 are aligned in a line. When the sliding member 1 passed the dead point, the torsional springs 2 are in the spring force releasing status to force the sliding member 1 out of the track member 3 to the position shown in FIG. 4. When wishing to close the sliding cover of the cell phone, imparts a push force to the sliding member 1 in the reversed direction.

By means of the energy reserving and releasing action of the two torsional springs, the user can easily close/open the sliding cover of the cell phone with less effort, i.e., the sliding cover is automatically moved to the close or open position when the user pushed the sliding cover the midpoint (dead point) of the full sliding stroke. The arrangement of the two torsional springs balances the sliding motion of the sliding member, supporting the sliding member in the sliding grooves against vibration. Further, because the track member is injection-molded from self-lubricating polymers, for example, polyoxymethylen, the track member can be held in close contact with the sliding member against vibration.

A prototype of sliding track assembly has been constructed with the features of FIGS. 1~4. The sliding track assembly functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sliding track assembly comprising:
   a sliding member, said sliding member having two sliding rails arranged in parallel at two sides, and two locating holes located between said sliding rails;
   a track member, said track member having a flat base and two parallel sliding grooves arranged in parallel and located on opposing edges of a top surface of said flat base of said track member, the two sliding rails of said sliding member are inserted into a corresponding sliding groove of the two parallel sliding grooves for allowing movement of said sliding member relative to said track member along said sliding grooves, and at least one locating hole located in the flat base between said sliding grooves; and
   two torsional springs located between said sliding member and said track member, said torsional springs each having a first end respectively fastened to the locating holes of said sliding member and a second end respectively fastened to the at least one locating hole of said track member;
   wherein said torsional springs are forced by said sliding member to reserve energy when said sliding member is moved relative to said track member, and start to release the energy to push said sliding member relative to said track member when said sliding member is moved over one half the sliding stroke;
   wherein, when said sliding member is located in a position selected from a group consisting of an open position and a closed position relative to said track member, said two torsional springs are oriented in a common direction.

2. The sliding track assembly as claimed in claim 1, wherein said sliding member further has a transverse bar located between said sliding rails and connected to a middle portion of each of said sliding rails, said two locating holes are located on said transverse bar.

3. The sliding track assembly as claimed in claim 1, wherein said sliding member has two opposite lateral sides curved to form said sliding rails.

4. The sliding track assembly as claimed in claim 1, wherein said sliding rails of said sliding member each have a plurality of mounting through holes for mounting; said track member has a plurality of mounting through holes in corners thereof for mounting.

5. The sliding track assembly as claimed in claim 1, wherein the at least one locating hole of said track member includes two locating holes located in the flat base, and the two locating holes of said track member are transversely aligned in a line between and relative to said sliding grooves.

6. The sliding track assembly as claimed in claim 1, wherein said track member is injection-molded from a copolymer.

7. The sliding track assembly as claimed in claim 6, wherein said copolymer is a self-lubricating plastic material.

8. The sliding track assembly as claimed in claim 7, wherein said self-lubricating plastic material is polyoxymethylen.

* * * * *